United States Patent [19]
Gilbert et al.

[11] Patent Number: 5,911,451
[45] Date of Patent: Jun. 15, 1999

[54] METHOD OF ADJUSTING STEERING MECHANISM

[75] Inventors: Wendell L. Gilbert, Pleasant Shade; Marjorie L. Heston, Old Hickory, both of Tenn.

[73] Assignee: TRW Inc., Lyndhurst, Ohio

[21] Appl. No.: 09/010,767

[22] Filed: Jan. 23, 1998

[51] Int. Cl.$^6$ .................................................. B23Q 17/00
[52] U.S. Cl. .................................. 29/407.08; 29/407.09; 180/427
[58] Field of Search ........................... 29/407.08, 407.09, 29/893.1, 893.2; 180/428, 427, 431

[56] References Cited

U.S. PATENT DOCUMENTS 3,986,408  10/1976  Takahashi et al. ........................ 74/499
4,700,794  10/1987  Bernhagen et al. ................... 180/6.44
4,779,646  10/1988  Vincent .

*Primary Examiner*—David P. Bryant
*Attorney, Agent, or Firm*—Tarolli, Sundheim, Covell, Tummino & Szabo

[57] ABSTRACT

To adjust the maximum torque required to actuate a hydraulic steering mechanism, the steering mechanism is first adjusted to provide a relatively high preload on gear teeth in the steering mechanism. The steering mechanism is then operated through a predetermined number of break-in cycles. After oil has been purged from the steering mechanism the steering mechanism is operated through one complete operating cycle and the location where the maximum torque is required to effect operation of the steering mechanism is noted. Preload between the gear teeth is then reduced and the steering mechanism is operated to the position where it was previously noted that maximum torque was required to actuate the steering mechanism. The steering mechanism is there dithered to either side of the location where the maximum torque was required. As this is done, the steering mechanism is adjusted to obtain the desired maximum operating torque for the steering mechanism.

9 Claims, 2 Drawing Sheets

METHOD OF ADJUSTING STEERING MECHANISM

BACKGROUND OF THE INVENTION

The present invention relates to a new and improved method of adjusting a steering mechanism and more specifically to a method of adjusting the maximum torque required to operate the steering mechanism.

It has previously been suggested that the maximum torque required to actuate a steering mechanism could be adjusted by operating the steering mechanism and monitoring the torque required to rotate an input shaft of the steering mechanism. During this operation of a steering mechanism, the steering mechanism is adjusted to require a desired maximum torque to actuate the steering mechanism.

SUMMARY OF THE INVENTION

The present invention provides a new and improved method of adjusting the maximum torque required to actuate a steering mechanism having first and second gears. The method comprises the steps of: (a) providing a preload between teeth on the first and second gears; (b) after providing the preload, performing a gear tooth break-in by moving the first and second gears against a simulated load; (c) after the break-in is complete, determining a location of the first and second gears at which a maximum force is required to move the first and second gears; (d) positioning the first and second gears at the location where the maximum force is required; (e) after positioning the first and second gears at the location where the maximum force is required, moving the first and second gears back and forth and simultaneously monitoring the force required to move the first and second gears; and (f) adjusting the first gear relative to the second gear to provide a desired maximum force to move the first and second gears.

During the break-in, the steering mechanism is operated to an extent to simulate use in a vehicle in excess of one hundred miles of vehicle travel.

BRIEF DESCRIPTION OF THE DRAWINGS

The foregoing and other features of the present invention will become more apparent upon a consideration of the following description taken in connection with the accompanying drawings wherein.

DESCRIPTION OF ONE SPECIFIC PREFERRED EMBODIMENT OF THE INVENTION

General Description

Figure 1:
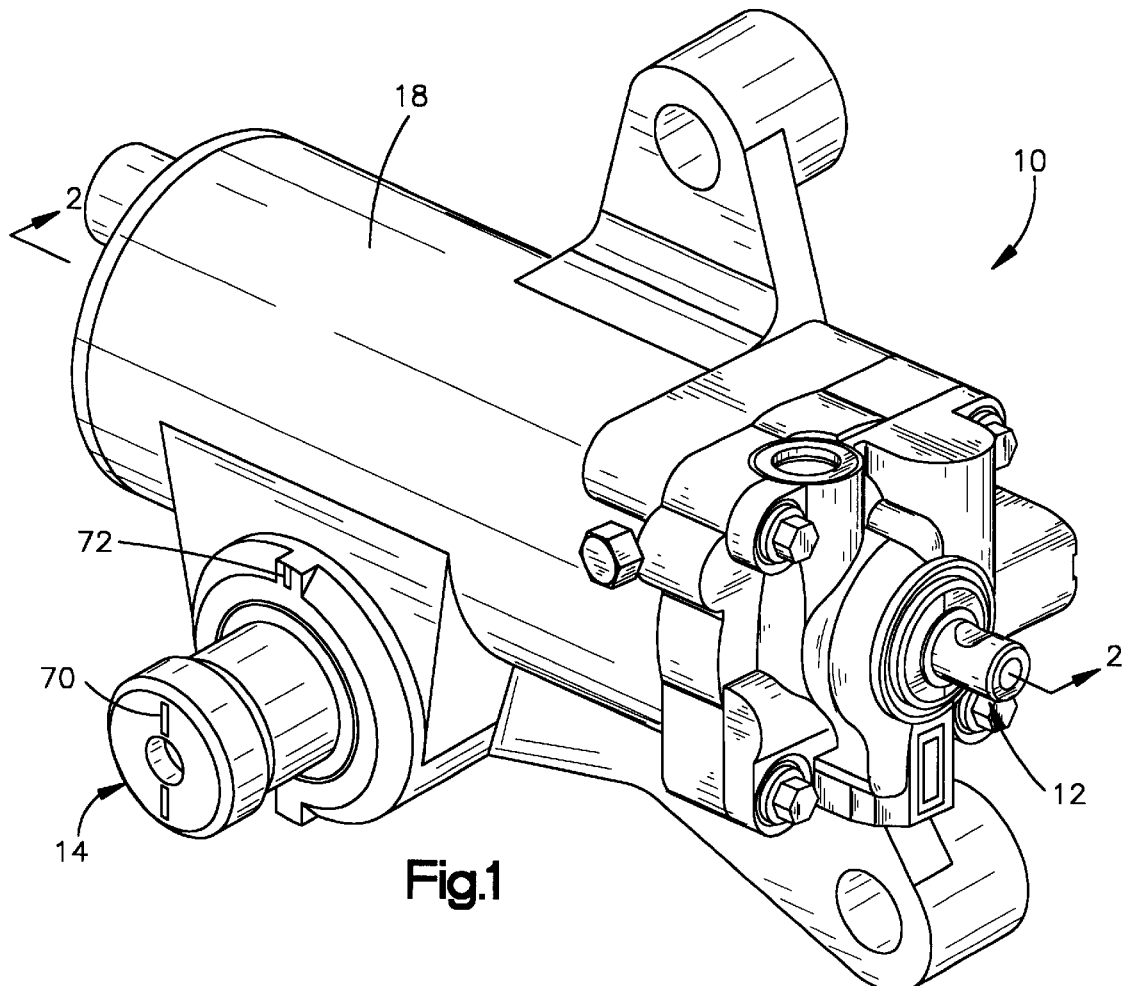
FIG. 1 is a pictorial illustration of a known steering mechanism which is adjusted in accordance with the method of the present invention.

A known steering mechanism 10 (FIG. 1) has an input shaft 12 and an output shaft 14. The input shaft 12 is rotatable about its central axis and is adapted to be connected with the steering wheel of a vehicle. The output shaft 14 is rotatable about its central axis and is adapted to be connected with steerable vehicle wheels.

It is contemplated that the steering mechanism 10 could be either manually actuated or power actuated. In the illustrated embodiment of the invention, the steering mechanism 10 is a hydraulic power steering mechanism of the integral type. However, the steering mechanism 10 could be of the rack and pinion type.

Figure 2:
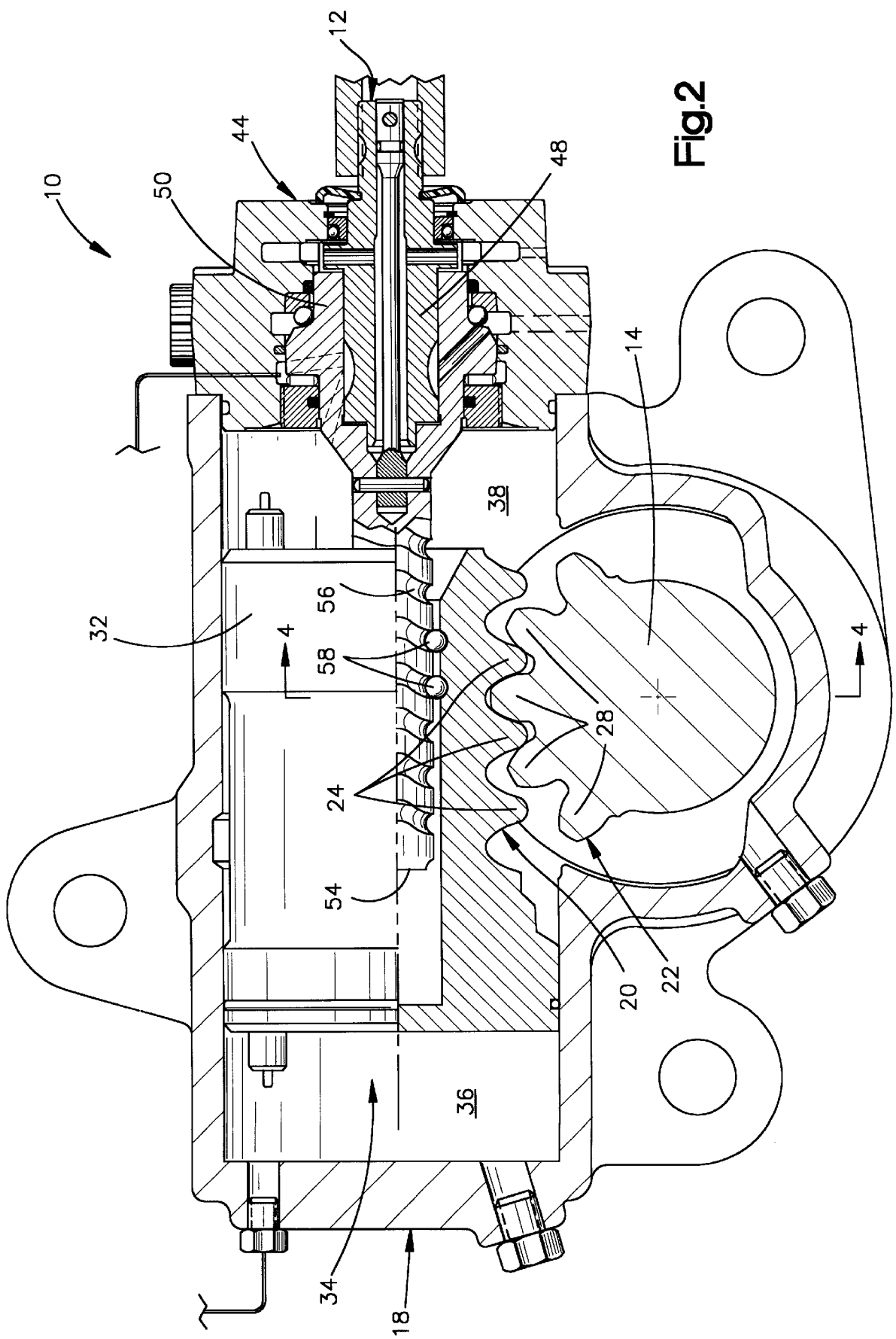
FIG. 2 is a simplified schematic sectional view, taken generally along the line 2—2 of FIG. 1, further illustrating the construction of the steering mechanism.

The steering mechanism 10 (FIG. 2) includes a housing 18 which encloses a pair of gears 20 and 22. The gear 20 has a linear array of helical rack gear teeth 24 which are disposed in meshing engagement with a circular array of helical gear teeth 28. The gear teeth 28 are shown integrally formed with the output shaft 14. The helical rack gear teeth 24 are disposed on a cylindrical piston 32 which is disposed in a cylindrical fluid chamber 34 in the housing 18. The piston 32 divides the fluid chamber 34 into a pair of chamber portions 36 and 38.

During operation of the steering mechanism 10, a fluid control valve 44 (FIG. 2) is operable to control fluid flow to and from the chamber portions 36 and 38. The input shaft 12 is integrally formed as one piece with a core 48 of the valve 44. The core 48 is enclosed by a cylindrical valve sleeve 50. The valve sleeve 50 is integrally formed as one piece with a follow-up member 54 having a screw thread 56 which engages a plurality of balls 58. The construction and mode of operation of the steering mechanism 10 is the same as is disclosed in U.S. Pat. No. 4,779,646, issued Oct. 25, 1988 and entitled "Fluid Flow Control Valve".

Upon rotation of the vehicle steering wheel, the input shaft 12 is rotated about its central axis. Rotation of the input shaft 12 actuates the valve 44 to port high pressure fluid to one of the chamber portions 36 or 38 and to vent the other chamber portion to ambient pressure. When this occurs, the piston 32 is moved axially in the piston chamber 34. Axial movement of the piston 32 in the piston chamber 34 causes the helical rack gear teeth 24 on the piston 32 to rotate the helical pinion gear teeth 28 on the output shaft 14. This rotational movement of the output shaft 14 is transmitted through a known steering linkage to the steerable vehicle wheels. As the piston 32 moves in the chamber 34, cooperation between the balls 58 and the screw thread 56 rotates the follow-up member 54 to actuate the valve 44 back toward its initial condition.

During operation of the steering mechanism 10, the amount of force, that is, torque, required to rotate the input shaft 12 will vary. It is desirable to adjust the steering mechanism 10 so that the maximum force (torque) required to rotate the input shaft 12 during operation of the steering mechanism 10 is less than a predetermined amount. The maximum force required to rotate the input shaft 12 may occur when the gears 20 and 22 are in any position throughout their range of movement. The rotational position of the input shaft 12 when the maximum force (torque) is required to rotate the input shaft will be different for different steering mechanisms 10. This is true even though each of the steering mechanisms have the same nominal construction.

The present invention provides an improved method of adjusting the steering mechanism 10 so that the maximum force which is required to rotate the input shaft 12 is less than a predetermined amount. To adjust the steering mechanism 10 to have a desired maximum operating torque, the steering unit is first operated through a break-in procedure. This is accomplished by applying a predetermined force to an adjustment screw (not shown) to shift the output shaft 14 axially, in the manner indicated by an arrow 64 in FIG. 4.

Figure 4:
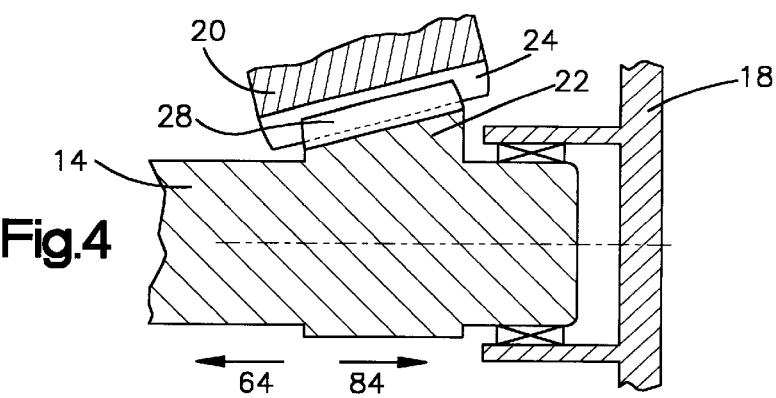
FIG. 4 is a schematic illustration depicting the manner in which one gear is moved relative to another gear in the steering mechanism of FIG. 1 to adjust the torque required to operate the steering mechanism.

This moves the gear 22 laterally relative to the housing 18 and the gear 20 on the piston 32. As shown in FIG. 4 the rack gear teeth 24 on the piston and the pinion gear teeth 28 on the output shaft 14 extend at an angle to the output shaft 14. Thus, axial movement of the output shaft 14 in the direction indicated by the arrow 64 in FIG. 4 increases the amount of interference between the gear teeth 22 and 24 and provides a preload between the gear teeth 22, 24.

In one specific embodiment, the steering mechanism 10, was operated to a straight ahead steering position (an on center condition). The adjustment screw was then rotated with thirty (30) to fifty (50) inch pounds of torque with a torque-controlled wrench. Force was transmitted from the adjusting screw to move the output shaft 14 axially and press flanks of the helical gear teeth 28 firmly against flanks of the helical rack gear teeth 24. It should be understood that the foregoing specific torque has merely been set forth herein for purposes of clarity of description and that the specific torque with which the adjusting screw is rotated may be different for steering mechanisms having different designs.

Once the preload between the gear teeth 24 and 28 has been established, the steering mechanism 10 is operated through a plurality of complete break-in operating cycles. During each break-in operating cycle, the input shaft 12 is rotated as far as possible in one direction, for example clockwise. This actuates the fluid control valve 44 as to apply hydraulic fluid pressure against one end of the piston 32. As the piston 32 moves to one end of its operating stroke, the output shaft 14 is rotated to one end of its range of movement.

The input shaft 12 is then rotated in the opposite direction (counterclockwise) to the opposite end of its operating range. This actuates the valve 44 to apply hydraulic fluid pressure against the opposite end of the piston 32 to rotate the output shaft 14 to the opposite end of its operating range. The direction of rotation of the input shaft 12 is again reversed to move the input shaft back to its initial or starting position. As this occurs, the piston 32 is moved in the chamber 34 under the influence of fluid pressure to rotate the output shaft 14 back to its original or starting position.

The steering mechanism 10 is operated through a number of break-in operating cycles sufficient to break-in the gear teeth 24 and 28. The number of break-in operating cycles is greater than the number of operating cycles which the steering mechanism 10 would experience in one hundred miles of vehicle travel if the steering mechanism was installed in a vehicle. With the previously mentioned specific steering unit 10, the steering mechanism was operated through at least ten complete break-in cycles. Of course, the number of break-in operating cycles may vary.

Once the steering mechanism 10 has been operated through a desired number of break-in cycles under the influence of hydraulic fluid pressure, the steering mechanism 10 is purged of hydraulic fluid. After the hydraulic fluid has been removed from the steering mechanism 10, the input shaft 12 is rotated to operate the steering mechanism 10 through one complete operating cycle. As this occurs, force is transmitted from the input shaft 12, through the fluid control valve 44, to the follow-up member 54.

Rotation of the follow-up member 54 moves the piston 32 in the chamber 34. Movement of the piston 32 rotates the output shaft 14. Since the hydraulic fluid has been removed from the steering mechanism 10, the operation of the steering mechanism through a complete operating cycle is accomplished independently of hydraulic fluid pressure.

During the break-in cycle or the dry runs, the torque required to rotate the input shaft 12 is continuously monitored and noted or recorded. The direction of rotation of the input shaft (clockwise or counterclockwise) and the location of the output shaft 14 are noted when the torque required to rotate the input shaft 12 is at a maximum.

The input shaft 12 is then rotated to the position where the maximum torque was required to operate the steering unit. At this time, a maximum force (torque) mark 70 (FIG. 1) is made on the output shaft 14. The maximum force mark 70 on the output shaft 14 is aligned with a timing mark 72 on the housing 18. Although the maximum force mark 70 is disposed on the output shaft 14, the maximum force mark 70 is indicative of the position of the input shaft 12 relative to the housing 18 when a maximum force (torque) is required to rotate the input shaft 12.

If desired, the maximum force mark 70 could be provided on the input shaft, 12. The maximum force mark on the input shaft 12 could then be directly aligned with a timing mark on the housing 18 if desired. However, if this was done, there would be more than one position of the input shaft 12 in which the maximum force mark would be aligned with the timing mark. This is because the input shaft 12 is rotated through more than one complete revolution to move the piston 32 through its operating stroke.

Figure 3:
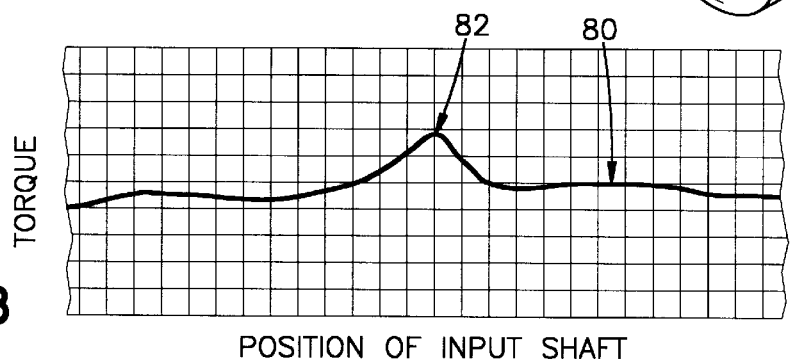
FIG. 3 is a graph illustrating the manner in which the torque required to operate the steering mechanism of FIG. 1 varies as a function of rotation of an input member of the steering mechanism.

The manner in which the torque (force) applied to the input shaft 12 for one specific embodiment of the steering mechanism 10 varied with rotation of the input shaft relative to the housing 18 is indicated by a curve 80 in FIG. 3. The location of the maximum force (torque) required to rotate the input shaft 12 is indicated by an arrow 82 in FIG. 3. When the maximum force mark 70 (FIG. 1) is aligned with the timing mark 72, the input shaft 12 is at a position corresponding to the position indicated by the arrow 82 in FIG. 3. Thus, the maximum force mark 70 and timing mark 72 cooperate to indicate the position of the input shaft 12 when a maximum force (torque) is applied to the input shaft.

The adjusting screw is then backed-off by a predetermined amount to reduce the force with which the helical pinion gear teeth 28 are pressed against the helical rack gear teeth 24 on the piston 32. Rotating the adjusting screw moves the output shaft 14 and gear 22 in the direction of an arrow 84 in FIG. 4. Movement of the gear 22 in the direction of the arrow 84 in FIG. 4 reduces the preload between the helical gear teeth 24 and 28 on the gears 20 and 22.

This results in a reduction in the maximum force (torque) which must be applied to the input shaft 12 to rotate the input shaft through the position indicated by the arrow 82 in FIG. 3. Although the magnitude of the maximum force (torque) which must be applied to the input shaft 12 is reduced by backing-off the adjusting screw by a predetermined amount, the location of the point where a maximum force (torque) must be applied to the input shaft to rotate the input shaft remains constant.

Once the maximum force (torque) required to operate the steering mechanism 10 has been reduced, in the manner previously explained, the steering mechanism 10 is operated back to the condition in which the maximum force mark 70 and timing mark 72 are aligned with each other. The input shaft 12 is then repeatedly rotated or dithered through a relatively small arc without operating the steering unit through a complete operating cycle. This effects movement of the output shaft 14 through an even smaller arc and movement of the maximum force mark 70 to opposite sides of the timing mark 72. As this occurs, the torque required to rotate the input shaft 12 is continuously monitored. While monitoring the torque applied to the input shaft 12, the adjustment screw is rotated to increase the amount of force (torque) required to rotates the input shaft 12 to an amount which corresponds to a desired maximum force (torque).

With one specific embodiment of the steering mechanism 10, the input shaft 12 was rotated through an arc of 28 degrees in each direction from the position in which the maximum force mark 70 is aligned with the timing mark 72. Thus, the input shaft 12 was rotated through 28 degrees in a clockwise direction from the position in which the maximum force mark 70 was aligned with the timing mark 72. This input shaft 12 was then rotated in a counterclockwise direction through an arc of 56 degrees. The input shaft 12 was then rotated through an arc of 56 degrees in a clockwise direction.

This back-and-forth rotation of the input shaft 12 was repeated while the adjusting screw was rotated to increase the interference between the teeth 28 on the pinion gear 22 and the teeth 24 on the rack gear 20. When the desired maximum torque to rotate the input shaft 12 and move the maximum force mark 70 to opposite sides of the timing mark 72 was achieved, the rotation of the adjusting screw and the input shaft 12 was interrupted. At this time, the desired maximum operating force (torque) for the steering mechanism 10 is established.

In the previously mentioned specific embodiment of the steering mechanism 10, the maximum torque which was required to rotate the input shaft 12 was between thirteen (13) and nineteen (19) inch pounds. Of course, the specific maximum torque to which the steering mechanism 10 is adjusted will depend upon the desired operating characteristics for a particular steering mechanism.

Although the foregoing description has been in conjunction with a steering mechanism 10 of the well known integral type which is normally operated under the influence of hydraulic fluid pressure, it should be understood that the method of the present invention could be used with many different types of steering units. For example, the invention could be utilized in association with a rack and pinion type steering unit which is operated under the influence of electrical energy.

From the above description of the invention, those skilled in the art will perceive improvements, changes and modifications. Such improvements, changes and modifications within the skill of the art are intended to be covered by the appended claims.

Having described the invention, the following is claimed:

1. A method of adjusting the maximum torque required to rotate an input shaft of a steering mechanism having first and second gears, said method comprising the steps of:

(a) providing a preload between teeth on said first and second gears;

(b) after providing the preload, performing a gear tooth break-in by moving said first and second gears;

(c) after said break-in is complete, determining a location of the first and second gears at which a maximum force is required to move the first and second gears;

(d) positioning the first and second gears at said location;

(e) after positioning said first and second gears at said location, moving the first and second gears back and forth through a predetermined distance and simultaneously monitoring the force required to move the first and second gears; and (f) adjusting said first gear relative to said second gear to provide a desired maximum force to move the first and second gears.

2. A method as defined in claim 1 further including the step of after step (c) and prior to step (d), adjusting said first gear to reduce the preload between said first and second gears.

3. A method as defined in claim 1 wherein said steering mechanism is a hydraulic power assist steering mechanism, and said step (b) is accomplished under the influence of force which is applied against components of said hydraulic assist steering mechanism by hydraulic fluid pressure.

4. A method as defined in claim 3 further including the step of purging hydraulic fluid from said hydraulic power assist steering mechanism prior to performance of step (c).

5. A method as defined in claim 1 wherein during step (e), an input shaft to said steering mechanism is rotated about 28 degrees in opposite directions.

6. A method as defined in claim 1 wherein said step (f) is performed while step (e) is being performed.

7. A method as defined in claim 1 wherein said step (f) includes axially moving one of said first and second gears relative to the other of said first and second gears.

8. A method as defined in claim 1 wherein said first gear moves linearly in a first direction through a first stroke upon rotation of an input shaft in one direction and moves linearly in an opposite direction through a second stroke upon rotation of the input shaft in a direction opposite the one direction, movement of the first gear through the first and second strokes comprises a cycle, and the first gear is a rack, and the second gear is a rotatable gear which rotates in opposite directions upon movement of the first gear in opposite directions and wherein said step of performing a gear tooth break-in comprises moving said first gear through a number of cycles.

9. A method as defined in claim 8 wherein said number of cycles is greater than the number of cycles which said first gear would experience in one hundred miles of vehicle travel if installed in a vehicle.

* * * * *